May 18, 1965 R. PREECE 3,183,882
PRESSURE RESPONSIVE INDICATING DEVICES
Filed Nov. 19, 1963 2 Sheets-Sheet 1

Inventor
Robert Preece
By
Winter, Bry, Adams & Tockman
Attorneys

May 18, 1965  R. PREECE  3,183,882
PRESSURE RESPONSIVE INDICATING DEVICES
Filed Nov. 19, 1963  2 Sheets-Sheet 2
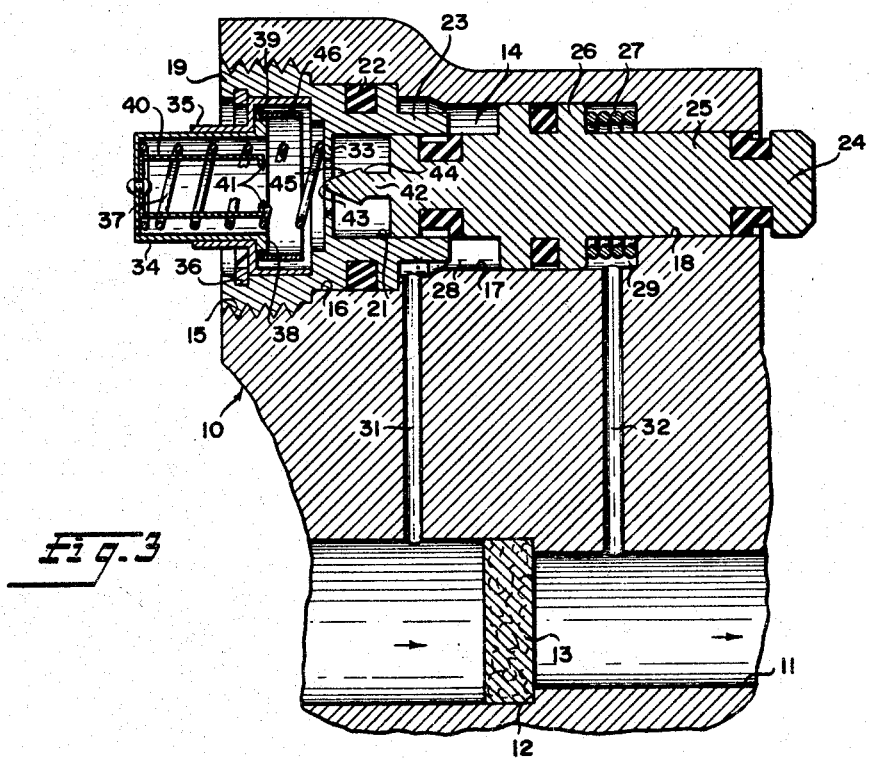
INVENTOR
Robert Preece
BY
ATTORNEYS

United States Patent Office 3,183,882
Patented May 18, 1965

3,183,882
PRESSURE RESPONSIVE INDICATING DEVICES
Robert Preece, Leamington Spa, England, assignor to Automotive Products Company Limited, Leamington Spa, England
Filed Nov. 19, 1963, Ser. No. 324,659
Claims priority, application Great Britain, Nov. 29, 1962, 45,186/62
6 Claims. (Cl. 116—70)

This invention relates to pressure responsive indicating devices and has for its object to provide a device which provides an indication when the pressure to which it is responsive exceeds a predetermined absolute value or the difference between two pressures exceeds a predetermined value.

According to the present invention, a pressure responsive indicating device comprises an indicator member resiliently biassed to an indicating position, a latch device to hold the indicator member in a non-indicating position against the biassing force, and a plunger operatively associated with the latch device, fluid pressure applied to the said plunger acting to move it to release the latch device when the said pressure provides a predetermined effective thrust on said plunger so that the indicating member moves to the indicating position when the pressure value producing that effective thrust is exceeded.

The indicator member may be a button urged outwardly to the indicating position by a spring, and the latch device may comprise a tapered projection extending between a pair of resilient arms, the engagement of said arms on the taper surfaces holding the indicator member against the biassing force, and the movement of the plunger by the fluid pressure disengages said resilient arms from said taper surfaces leaving the indicator member free to move to the indicating position.

The indicating device according to the invention is particularly useful in connection with filters, for providing an indication of the fact that a filter has become blocked, but it is also useable for other purposes.

The invention is hereinafter described with reference to the accompanying drawing which shows an indicating device according to the invention incorporated in a filter and in which:

FIGURE 3 is a view similar to FIGURE 1, but illustrating the device when in an indicating position.

Figure 1:
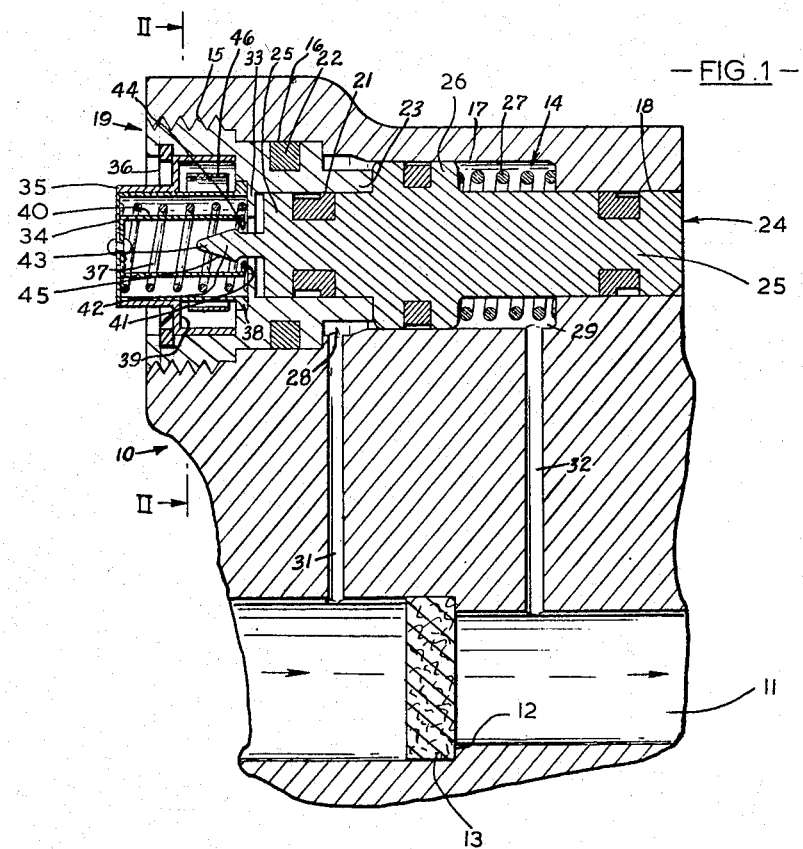
FIGURE 1 is a partial sectional elevation of a liquid filter embodying the invention.

Referring to the drawings, a filter housing, part of which is shown at 10, has a main bore 11 with a shoulder 12 in which rests a filter pad 13, liquid to be filtered being passed through the main bore 11 from left to right as indicated by the arrows in FIGURE 1. Also formed in the filter housing is a stepped bore 14 open at both ends and having parts 15, 16, 17 and 18 of four different diameters, the smallest part 18 being at one end and the diameters increasing towards the other end. The largest diameter part 15 is screw-threaded and receives a tubular screw-threaded plug 19 the bore 21 of which, at its inner end, is of the same diameter as the smallest part 18 of the bore 14. The plug 19, which is a close fit in the larger intermediate-diameter part 16 of the bore 14 and carries a packing ring 22 making a fluid-tight joint with the wall of that part 16 of the bore 14, has an extension of smaller diameter 23 extending with clearance into the smaller intermediate-diameter part 17 of the bore 14. A plunger 24 slidably mounted in the bore 14 has end portions 25 fitting in the smallest-diameter part 18 of that bore and in the bore 21 of the plug, and a larger central portion 26 fitting in the smaller intermediate-diameter part 17 of the bore 14, each end portion 25 and the central portion 26 carrying a packing ring to make a fluid tight joint with the surrounding cylindrical wall. A coiled compression spring 27 in the smaller intermediate-diameter part 17 of the bore 14 urges the plunger 24 towards the plug 19, movement of the plunger 24 in this direction being limited by engagement of its central portion 26 with the end of the extension 23 of the plug.

The annular spaces 28 and 29 on opposite sides of the central portion 26 of the plunger are connected respectively to the main bore 11 on the upstream and downstream sides of the filter pad 13 by passages 31 and 32 the connection to the upstream side being on the same side of the said central portion 26 as is the plug 19.

The bore of the plug 19 at its outer end is larger than at its inner end and an internal flange 33 at the junction of the two parts of the said bore partially closes the connection between them. A hollow button 34 is slidably mounted in a stepped sleeve 35 retained in the outer end of the plug bore by a clip ring 36 and is urged outwardly by a coiled compression spring 37 mounted inside it and reacting on the internal flange 33 in the plug, outward movement of the button 34 being limited by engagement of an external flange 38 at the inner end thereof with an internal shoulder 39 formed by the step of the sleeve 35.

Inside the button 34 there is mounted a resilient member 40 having two limbs the ends of which are turned inwardly at 41. The end of the plunger 24 which extends into the plug 19 carries a central projection 42 having a head 43 of double-conical shape, the cone angle of its side 44 which faces the end of the plunger 24 being greater than the cone angle of its side 45 which faces away from the plunger. When the plunger 24 is in engagement with the extension 23 on the plug, and the button 34 is in its inward position, the inturned ends of the limbs of the member 40 engage with the side 44 of the head 43 on the plunger projection facing the plunger itself, and the button 34 is held in its inward position, the spring 37 acting thereon not having sufficient strength to pull the member 40 over the largest diameter of the head 43 on the plunger projection 42. FIGURE 1 shows the parts in this position.

The projection 42 and the members 41 thus form together a latch device to hold the button 34 retracted.

Under normal pressure conditions in the filter the pressure drop across the filter element 13 is such that the difference in liquid pressure acting on the two sides of the plunger 24 produces a thrust which is not great enough to move the plunger against the spring 27 acting on its largest-diameter portion, but if the filter becomes obstructed the pressure difference increases until it produces a thrust in the plunger 24 sufficient to overcome the spring 27 and pull the head 43 on the projection 42 past the inturned ends 41 of the limbs of the member 39 thus allowing the button 34 to spring outwardly. The strength of the spring 27 which opposes movement of the plunger 24 by the pressure may be chosen to provide release of the indicator button 34 at any desired pressure.

Figure 2:
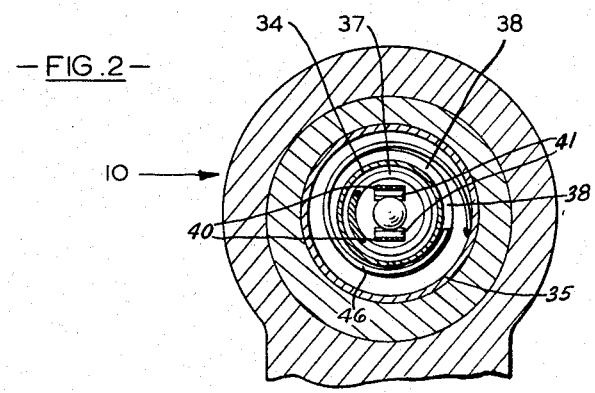
FIGURE 2 is a section on the line 2—2 of FIGURE 1.

In order to prevent the indicator button 34 from being released due to a high pressure drop across the filter pad 13 caused by high viscosity of the liquid at low temperature, a coiled bimetallic element 46 may be mounted around the button 34 and anchored at its outer end to the sleeve 35. At low temperatures the bimetallic element 45 contracts and engages the outer surface of the button, thus inhibiting outward movement. FIGURE 2 shows the element 46 in this position of button 34 by interfering with its movement through the outwardly extending rim or flange 38.

The indicating device, instead of being a sliding button, may be a pivoted arm or flap held by the latch device in a retracted position, for example flat against or recessed into a surface of the structure on which it is mounted, the arm or flap being urged by a spring, when the latch is released, to a position in which it projects substantially at right angles to the said surface.

I claim:

1. A pressure responsive indicating device comprising a housing, bore means in said housing, plunger means slidably disposed in said housing, hollow plug means secured in one end of said bore means, said plunger means having one end extending into the adjacent end of said plug means, said plunger means having an enlarged central portion, inlet and outlet passage means in said housing in communication with opposite sides of said central portion to transmit differential pressure thereacross, biasing means normally urging said central portion against said plug means, an outer sleeve extending into and secured to said plug means adjacent said one end of said plunger means, a hollow inner sleeve disposed within said outer sleeve forming an indicator button, other biasing means normally urging said button toward an indicating position outside of said outer sleeve, a pair of resilient arms on the end of said inner sleeve adjacent said one end of said plunger means, said arms extending radially inwardly toward each other to form an opening therebetween, a projection extending beyond said one end of said plunger means and into said hollow inner sleeve and between said arms, a head on the end of said projection of larger area than said opening, whereby said button is latched in a non-indicating position until the differential pressure across said central portion of the plunger means exceeds a predetermined value to cause said head to move out of said inner sleeve and release said button.

2. The device of claim 1 wherein said biasing and other biasing means are coil springs and said outer sleeve is stepped and has a smaller diameter extending out of the outer portion of the housing and a larger diameter disposed inwardly thereof.

3. The device of claim 2 wherein said larger diameter has a circular bimetallic member therein and secured thereto, and said inner sleeve has an outturned peripheral flange on its inner end adjacent said head, and said element is disposed to abut said flange to prevent said button moving to an indicating position when the temperature is below a predetermined value.

4. The device of claim 1 wherein said head is of a double conical shape, with the cone angle of its side which faces the end of the plunger means being substantially greater than the cone angle of its side facing away from the plunger means.

5. A pressure responsive indicating device comprising a housing, said housing having a bore therein, a cylindrical plunger slidably disposed in one end of said bore, a hollow plug threaded into the other end of said bore, one end of said plunger extending into said plug, the inner end of said plug forming a shoulder, said plunger having a central enlarged portion, biasing means normally urging said enlarged portion against said shoulder, fluid inlet and outlet passage means in said housing in communication with opposite sides of said central enlarged portion to transmit differential pressure thereacross, said plug having an outer enlarged bore therein, an outer sleeve secured in said enlarged bore comprising a reduced diameter portion, an outwardly extending flange, an enlarged diameter portion inwardly of its flange, an inner sleeve with an outwardly extending rim on its inner end slidably disposed within said outer sleeve and forming an indicator button, a spring member within said inner sleeve normally urging it outwardly of said outer sleeve to an indicating position, an extension projecting out of said plunger extending into said plug, said extension projecting within said inner sleeve, a resilient member carried within said inner sleeve and provided with a pair of spaced inturned arms adjacent the inner end of said inner sleeve, said extension having an enlarged double conical shaped head thereon of greater area than said space to form a latch device with said arms and prevent movement of said button to an indicating position until the differential pressure across said plunger exceeds a predetermined value to cause said head to move from between said arms.

6. The device of claim 5 wherein a coiled bimetallic member has one end fixed to said outer sleeve and is disposed in its enlarged diameter portion and is mounted around said inner sleeve and is of a size to be engaged by said inner sleeve rim when the temperature is below a predetermined value.

References Cited by the Examiner

UNITED STATES PATENTS

| 2,954,751 | 10/60 | Barnes | 116—70 |
| 2,935,040 | 5/60 | Steensen | 116—70 |
| 2,979,021 | 4/61 | Scavuzzo | 116—70 |
| 3,045,826 | 7/62 | Howard et al. | 116—70 X |
| 3,080,972 | 3/63 | Smith | 116—70 X |

LOUIS J. CAPOZI, *Primary Examiner.*